United States Patent Office 3,325,475
Patented June 13, 1967

3,325,475
ORGANIC AMINE SALTS OF SACCHARIN
Lubomir C. Vacek, Toledo, Ohio, assignor to Maumee Chemical Company, Toledo, Ohio, a corporation of Ohio
No Drawing. Filed Nov. 16, 1964, Ser. No. 411,560
7 Claims. (Cl. 260—211)

This invention relates to organic amine salts of saccharin,[1] and, more particularly, to physiologically acceptable organic amine salts of saccharin which are useful as sweetening agents.

Saccharin has been known for many years as a sweetening agent, and has found relatively widespread use, largely because it is substantially non-caloric. More recently, inorganic salts of cyclohexylsulfamic acid, generally known as "cyclamate," have been advocated as non-caloric sweetening agents. It has been found, however, that both saccharin and cyclamate, the two most commonly used non-caloric sweetening agents, have a bitter or "off" taste to a substantial percentage of the populous. It has been suggested that mixtures of inorganic salts of saccharin and cyclamate, in certain proportions, are preferable to saccharin alone, and also perferable to cyclamate alone, because the bitter or "off" taste characteristic of each is objectionable to a smaller percentage of the populous.

The present invention is based upon the discovery of certain physiologically acceptable organic amine salt of saccharin, and mixed salts of saccharin and cyclohexylsulfamic acid, which are substantially free of the bitter or "off" taste characteristic of the metal salts of both saccharin and cyclohexylsulfamic acid which have heretofore been used. Such salts are, in general, alcohol amine salts of saccharin, polyhydric alcohol amine salts of saccharin, alkylene diamine salts of saccharin and mixed cyclohexylsulfamic acid-saccharin di-salts of alkylene diamines.

It is, therefore, an object of the invention to provide an improved family of substantially non-caloric sweetening agents.

It is a further object of the invention to provide improved sweetening agents which are physiologically acceptable and which are alcohol amine salts of saccharin, polyhydric alcohol amine salts of saccharin, or alkylene diamine salts of saccharin or mixed salts of saccharin and cyclohexylsulfamic acid.

Other objects and advantages will be apparent from the description which follows, which is intended only to illustrate and disclose, and in no way to limit the invention.

[1] The term "organic amine salts of saccharin" is used herein to mean salts having the characteristic structure

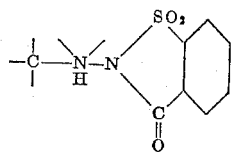

Such salts can also be named as organic ammonium salts.

According to the invention a family of improved substantially non-caloric sweetening agents is provided. Such sweetening agents are, in general, alcohol amine salts of saccharin, polyhydric alcohol amine salts of saccharin, alkylene diamine salts of saccharin and mixed saccharin-cyclohexylsulfamic acid salts of alkylene diamines.

Such salts can, in general, be produced by preparing a slurry of saccharin (acid form), and adding the slurry to a solution containing an equivalent amount of the organic amine. Water is a suitable solvent system in which to conduct this ionic reaction. If preferred, the pH of the salt to be produced can be determined by calculation or experimentally, and the saccharin slurry can then be added to the organic amine solution until the indicated pH is achieved.

Similarly, where mixed saccharin-cyclohexylsulfamic acid salts are desired, an equimolecular amount of saccharin suspension can be added to a solution of a diamine, and an equimolecular amount of cyclohexylsulfamic acid can then be added to the reaction product.

The desired saccharin salt or saccharin-cyclohexylsulfamic acid double salt can be recovered from the solution in which it is prepared by evaporation of the water, preferably under vacuum to minimize the chance of hydrolysis.

Examples of organic amines from which salts which are substantially non-caloric sweetening agents can be produced by reaction with saccharin include monoethanolamine, diethanolamine, amino sugars, for example, 1-amino-1-deoxy-D-glucitol, and 1-deoxy-1-(methylamino) glucitol, and alkylene diamines such as ethylene diamine, and including cyclics such as piperazine (diethylenediamine).

It will be appreciated that the saccharin salts according to the invention may have a slightly higher caloric content than saccharin itself, particularly the amino deoxy sugar salts of saccharin. However, the slight caloric content is immaterial, because such a small quantity of the saccharin salts is required to perform a particular sweetening function that the effect is negligible. The results of taste tests indicate that saccharin salts according to the invention are substantially free of any "off" taste which is characteristic of cyclamate and of any bitter aftertaste which is characteristic of saccharin, and are preferable, even, to mixtures of the two, at least to a substantial segment of the population.

The following examples are presently solely for the purpose of further illustrating and disclosing the invention, but are in no way to be construed as limitations thereon.

EXAMPLE 1

The monoethanolamine salt of saccharin was prepared in a 250 cc. beaker. The beaker was charged with 18.32 g. saccharin (acid form) slurried with 50 ml. water. A 50 cc. portion of a 2 normal water solution of monoethanolamine was then added to the beaker, with agitation. About ten minutes after the monoethanolamine solution addition was completed, a pale yellow solution was noted in the beaker. A 1 gram portion of C–190–N activated carbon was added to the light yellow solution in the beaker; the resulting mixture was stirred for 15 minutes; and the carbon was removed from the solution by filtration in a Buechner funnel, using filter aid and vacuum. The resulting solution was water clear and colorless. The colorless solution was evaporated under vacuum at a maximum temperature of 60° C., and was then dried to constant weight at a temperature of about 60° C. The final drying required approximately 5 hours. A crude yield of 25.7 grams of the monoethanolamine salt of saccharin was obtained. The salt was a viscous, lightly yellow oil which solidified upon standing overnight into a light, pale yellow, crystalline solid mass.

EXAMPLE 2

Substantially the procedure described in Example 1 has been used to produce various other organic amine salts of saccharin. The reactants which were used and the nature of the final product are set forth in Table I, below:

TABLE I

| Procedure No. | Organic Amine | | Grams of Saccharin | Manner of Isolation | Product | | |
|---|---|---|---|---|---|---|---|
| | Identity | Ml. | | | Identity | Grams | Description |
| 2 | Diethanolamine | ¹ 50 | 18.32 | Evaporation to constant weight. | Diethanolamine salt of saccharine. | 29.57 | Viscous oily liquid which solidified on standing into a solid crystalline mass. |
| 3 | Piperazine ² | ³ 19.42 | 36.64 | By crystallization upon cooling to 20° C. | Di-saccharine salt of piperazine. | 40.07 | White crystalline solid. |
| 4 | 1-amino-1-deoxy-D-glucitol. | ⁴ 100 | 18.32 | Evaporation to constant weight. | Saccharin salt of 1-amino-1-deoxy-D-glucitol. | 37.37 | Thick, light-amber colored oil which solidified on standing into a tacky solid having the appearance of glass. |

¹ Added as 2 N water solution.
² Reaction was conducted at a temperature of 70 to 80° C.
³ Grams.
⁴ Added as 1 N water solution.

The procedures described above can also be used to produce saccharin salts of 1-deoxy-1-(methylamino) glucitol, ethylenediamine, pentamethylenediamine, tetramethylenediamine and the like. In producing the diamine salts the procedure should be similar to No. 3, where two equivalents of saccharin are used per mole of the organic amine. Also, using the diamines, the mixed saccharin-cyclohexylsulfamic acid salts can be produced, as indicated above, by first reacting equimolecular proportions of saccharin or cyclohexylsulfamic acid with the diamine, and then reacting an equimolecular proportion of the other acid with the product of the first reaction.

As has been indicated, the organic amine salts according to the invention are unexpectedly advantageous by comparison with previously known, non-caloric sweetening agents because they do not have the bitter or "off" taste which is characteristic of such other agents. In addition, the organic amine salts according to the invention are extremely soluble in water, so that highly concentrated, liquid solutions thereof can be marketed. This is peculiarly advantageous in many fields where non-caloric sweetening agents are desired.

It will be apparent that various changes and modifications can be made from the specific details set forth herein without departing from the spirit and scope of the invention as defined in the appended claims.

What I claim is:
1. As a new composition of matter, the diethanolamine salt of saccharin.
2. The monoethanolamine salt of saccharin.
3. The saccharin salt of an aminodeoxysugar wherein said sugar is 1-deoxy-1-(methylamino) glucitol or 1-amino-1-deoxy-D-glucitol.
4. The saccharin salt of claim 3, wherein the sugar is 1-amino-1-deoxy-D-glucitol.
5. The saccharin salt of claim 3, wherein the sugar is 1-deoxy-1-(methylamino) glucitol.
6. The saccharin-cyclohexylsulfamic acid disalt of piperazine.
7. The saccharin salt of ethylenediamine.

References Cited

Sato, "Chem. Abstracts," vol. 54, 1960, page 16, 471a.

LEWIS GOTTS, *Primary Examiner.*

JOHNNIE R. BROWN, *Assistant Examiner.*